US012035690B2

(12) United States Patent
Diskin et al.

(10) Patent No.: US 12,035,690 B2
(45) Date of Patent: Jul. 16, 2024

(54) HANGING CAT SCRATCHER

(71) Applicant: WORLDWISE, INC., Novato, CA (US)

(72) Inventors: Aimee Diskin, Napa, CA (US); Hannah Rosenberg, San Francisco, CA (US); Michael Risso, Napa, CA (US); Julie Widenhofer, San Anselmo, CA (US); Lisa Davis, Novato, CA (US)

(73) Assignee: Worldwise, Inc., Novato, CA (US)

( * ) Notice: Subject to any disclaimer, the term of this patent is extended or adjusted under 35 U.S.C. 154(b) by 0 days.

(21) Appl. No.: 17/875,538

(22) Filed: Jul. 28, 2022

(65) Prior Publication Data

US 2024/0032509 A1 Feb. 1, 2024

(51) Int. Cl.
*A01K 15/02* (2006.01)

(52) U.S. Cl.
CPC .................................. *A01K 15/024* (2013.01)

(58) Field of Classification Search
CPC .... A01K 15/024; A01K 15/00; A01K 15/025; A01K 13/004
USPC .......................................................... 119/706
See application file for complete search history.

(56) References Cited

U.S. PATENT DOCUMENTS

| | | | | |
|---|---|---|---|---|
| 3,085,551 A * | 4/1963 | Helmer | ................ | A01K 15/024 119/706 |
| 3,486,485 A * | 12/1969 | Kahanick | ............. | A01K 15/024 119/706 |
| 4,539,936 A * | 9/1985 | Majewski | ............ | A01K 15/024 49/460 |
| 5,167,205 A * | 12/1992 | Bell | ...................... | A01K 1/0125 229/122.34 |
| 5,247,902 A * | 9/1993 | Williams | ............. | A01K 15/024 119/706 |
| 7,117,821 B2 * | 10/2006 | Novak | ................. | A01K 15/024 119/706 |
| D555,299 S * | 11/2007 | Tsengas | ....................... | D30/160 |
| D563,059 S * | 2/2008 | Lamstein | .................... | D30/160 |
| 7,565,884 B2 * | 7/2009 | Lamstein | ............. | A01K 15/024 119/706 |
| 7,647,893 B2 * | 1/2010 | Kraus | .................. | A01K 1/0356 119/702 |
| D644,797 S * | 9/2011 | Haaf | ........................... | D30/160 |
| 8,141,519 B2 * | 3/2012 | Salzman | ............... | A01K 1/033 119/482 |
| D665,138 S * | 8/2012 | Haaf | ........................... | D30/160 |
| 8,578,890 B1 * | 11/2013 | Haaf | .................... | A01K 15/024 119/706 |
| 8,640,652 B2 * | 2/2014 | Callari | .................. | A01K 1/035 119/702 |
| 9,624,026 B1 * | 4/2017 | Al-Heraibi | | |
| 10,111,406 B2 * | 10/2018 | Rogers | ...................... | B32B 7/05 |
| 10,412,926 B2 * | 9/2019 | Chen | ..................... | A01K 1/033 |
| 10,609,903 B1 * | 4/2020 | Tsengas | ............. | A01K 15/024 |
| 2006/0042560 A1 * | 3/2006 | Novak | ................. | A01K 15/024 119/706 |

(Continued)

*Primary Examiner* — Timothy D Collins
*Assistant Examiner* — Maria E Graber
(74) *Attorney, Agent, or Firm* — Calfee, Halter & Griswold LLP

(57) ABSTRACT

A cat scratcher having a frame of sidewalls encompassing a block of open-fluted cardboard and a planar back member with a removable panel. Removing the panel exposes a surface of the block of open-fluted cardboard. The panel may be defined by perforations in the planar back member.

20 Claims, 3 Drawing Sheets

(56) References Cited

U.S. PATENT DOCUMENTS

| | | | | |
|---|---|---|---|---|
| 2006/0137623 A1* | 6/2006 | Lamstein | ............ | A01K 15/024 |
| | | | | 119/706 |
| 2006/0191490 A1* | 8/2006 | Lamstein | ............ | A01K 15/024 |
| | | | | 119/706 |
| 2007/0295282 A1* | 12/2007 | Lamstein | ............ | A01K 15/024 |
| | | | | 119/706 |
| 2008/0149041 A1* | 6/2008 | Lamstein | ............ | A01K 15/024 |
| | | | | 119/706 |
| 2008/0290150 A1* | 11/2008 | Kraus | ............ | A01K 1/0356 |
| | | | | 229/149 |
| 2010/0122665 A1* | 5/2010 | Delzio | ............ | A01K 15/024 |
| | | | | 119/706 |
| 2014/0000531 A1* | 1/2014 | Sumitsuji | ............ | A01K 15/025 |
| | | | | 119/707 |
| 2014/0014043 A1* | 1/2014 | McCann | ............ | A01K 15/024 |
| | | | | 119/706 |
| 2016/0338315 A1* | 11/2016 | Floyd | ............ | A01K 1/0245 |
| 2017/0137206 A1* | 5/2017 | Ting | ............ | B65D 5/46008 |
| 2022/0053734 A1* | 2/2022 | Lofranco | ............ | A01K 15/024 |

* cited by examiner

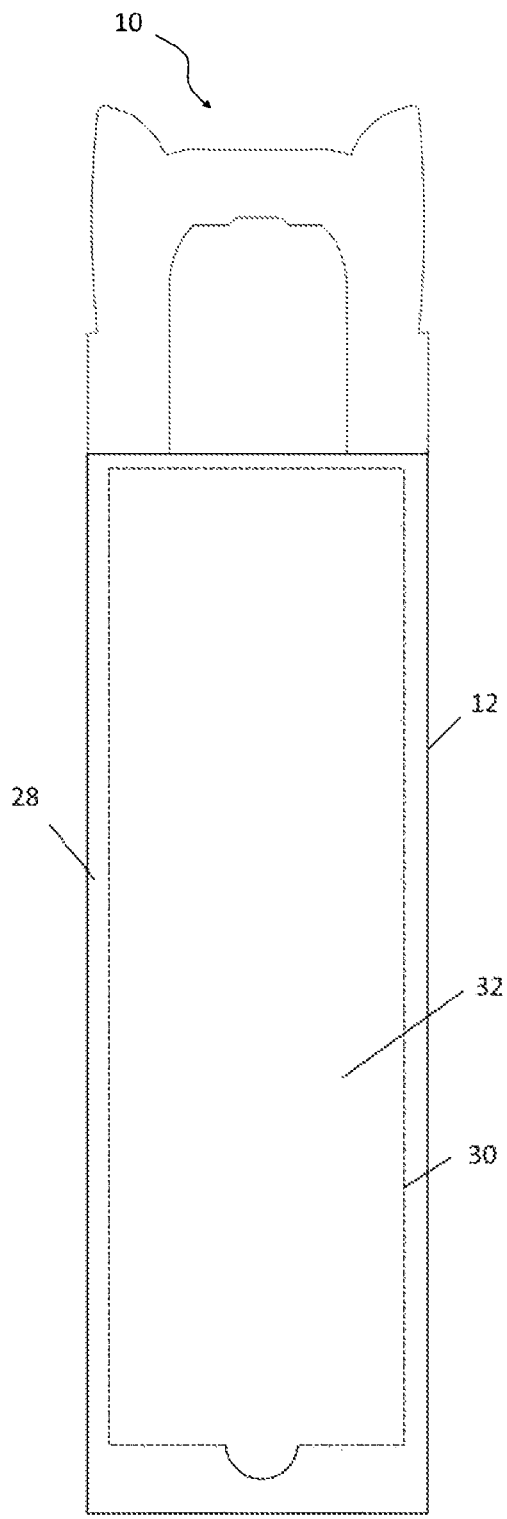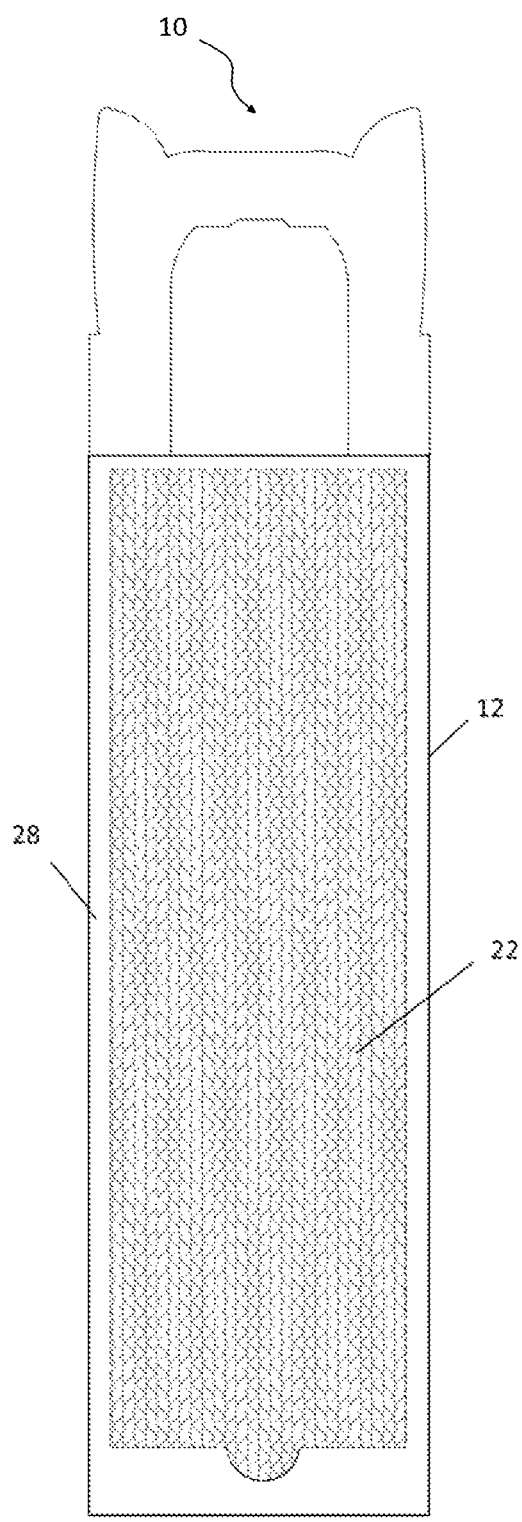

HANGING CAT SCRATCHER

TECHNICAL FIELD

The present invention involves a cat scratcher-based attractant and amusement device capable of encouraging a domestic cat to employ a dedicated scratching surface rather than furniture, carpets and drapes and to maintain a cat's interest for prolonged periods of time in doing so.

BACKGROUND OF THE INVENTION

It is quite important for the health and well-being of a pet to not only feed it properly but also provide it with stimulating activities. Pets which become bored oftentimes become destructive not only of their surroundings but also themselves. Animals which are not appropriately stimulated can actually suffer adverse health effects and as a consequence. As such, proper pet stimulation should be a significant consideration for virtually all pet owners.

It is similarly well recognized that domestic cats crave scratching as part of their natural instinctive character. If a dedicated scratching surface is not provided, domestic cats will generally satisfy their need to scratch by turning to furniture, curtains and other articles which can be substantially damaged as a consequence. Often times, pet cats will not only climb over furniture, specifically upholstered chairs and sofas, but will use such furniture and carpeting to condition their claws through deliberate repeated clawing, pulling and tearing actions specifically with their forepaws. As noted, this clawing activity appears to be an irresistible natural impulse for cats and can be the source of great aggravation to pet owners.

However, the process of scratching is necessarily destructive as the surface must give to some extent to satisfy the cat. Correspondingly, the exposed surface is subject to degradation and once sufficiently worn, loses its appeal to the cat.

It is thus an object of the present invention to provide a cat scratcher having increased longevity that may occupy a cat for a relatively greater length of time.

It is a further object of the present invention to provide a cat scratcher that includes corrugate blocks that can be treated with an appropriate attractant to help stimulate the cat and encourage use of the cat scratcher.

It is still a further object of the present invention to provide a cat scratcher which maintains integrity over time to facilitate use by the cat.

These and further examples will be more readily apparent when considering the following disclosure and appended claims.

SUMMARY OF THE INVENTION

A cat scratcher comprising a frame of sidewalls encompassing a block of open-fluted cardboard and a planar back member with a removable panel. Removing the panel exposes a surface of the block of open-fluted cardboard. The panel may be defined by perforations in the planar back member.

BRIEF DESCRIPTION OF THE DRAWINGS

FIG. 2 is an elevational view of the back of the cat scratcher illustrating the perforated panel, according to an embodiment of the disclosure.

FIG. 3 is an elevational view of the back of the cat scratcher with the perforated panel removed, according to an embodiment of the disclosure.

DETAILED DESCRIPTION OF THE INVENTION

Figure 1:
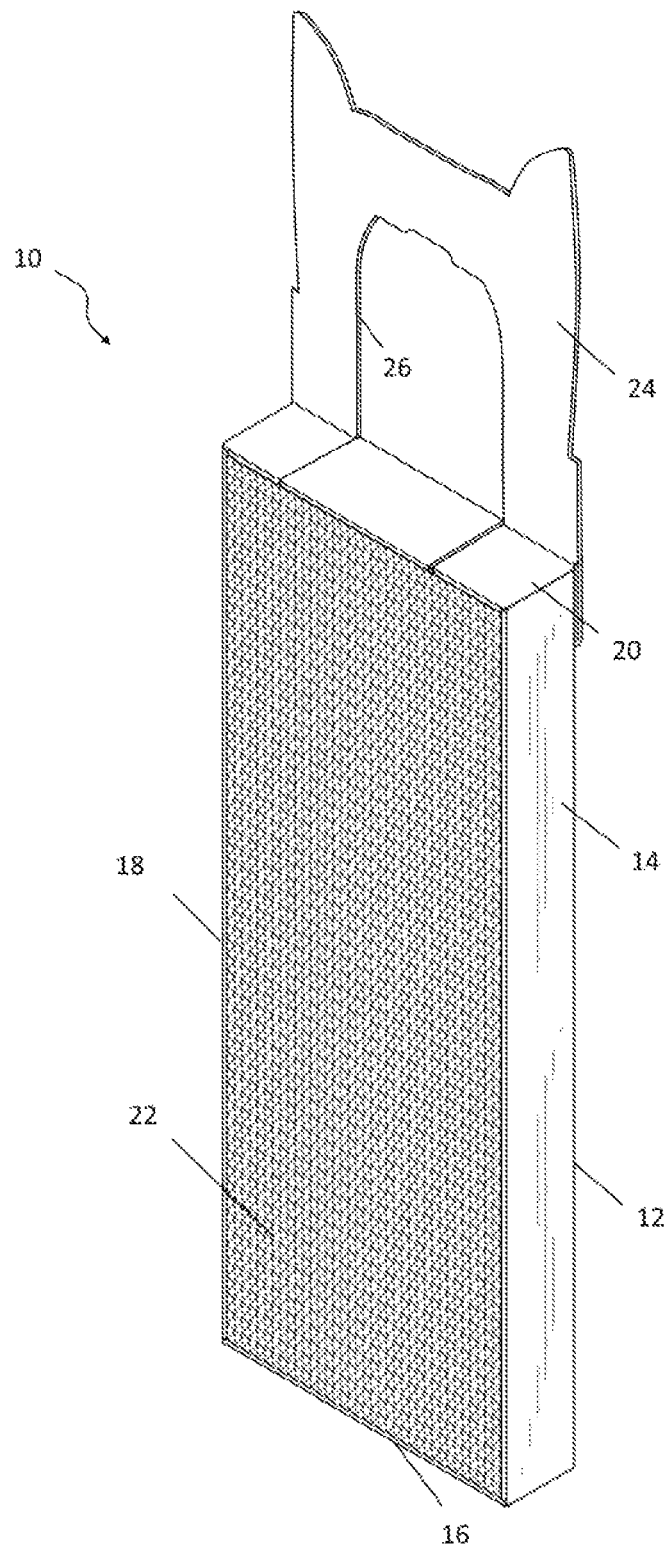
FIG. 1 is a perspective view of the cat scratcher, according to an embodiment of the disclosure.

Novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration description only and are not intended as definitions of the limits of the invention. The various features of novelty which characterize the invention are recited with particularity in the claims.

There has been broadly outlined more important features of the invention in the summary above and in order that the detailed description which follows may be better understood, and in order that the present contribution to the art may be appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important therefore, that claims be regarded as including such equivalent constructions insofar as they do not depart from the spirit and scope of the present invention.

Certain terminology and the derivations thereof may be used in the following description for convenience and reference only, and will not be limiting. For example, words such as "upward," "downward," "left," and "right" refer to directions in the drawings to which reference is made unless otherwise stated. Similar words such as "inward" and "outward" refer to directions toward and away from, respectively, the geometric center of a device or area and designated parts thereof. Reference in the singular tense include the plural and vice versa, unless otherwise noted.

In turning first to FIG. 1, an embodiment of this disclosure is cat scratcher 10 that includes a substantially rectangular box 12 ideally composed of cardboard bent and configured into the shape as illustrated and defined by four sidewalls 14, 16, 18 and 20. A block 22 of open-fluted corrugated cardboard is encompassed and is affixed to the sidewalls so that a front surface is exposed and accessible to the cat. Sidewalls 14, 16, 18 and 20 form a frame to support and contain block 22, helping maintain its integrity during use over time. Hanger 24 has an aperture 26 configured to fit over a door handle so that cat scratcher 10 can be hung if desired and is shown in this embodiment with a decorative "cat head" profile but other suitable shapes, such as a hook, are also within the scope of this disclosure. As depicted in FIG. 2, back 28 of box 12 is provided as a planar sheet extending between and secured to the respective opposing sidewalls. Back 28 is preferably of cardboard and has perforated outline 30 that allows panel 32 to be removed to expose a rear surface of block 22 according to FIG. 3. As will be appreciated, removing panel 32 exposes a fresh surface after the front becomes too worn to satisfy the cat and thereby extends the useful working life of cat scratcher 10. In some embodiments, any or all of the sidewalls 14, 16, 18 and 20, hanger 24 and back 28 may be formed from a single sheet of material.

Figure 4:
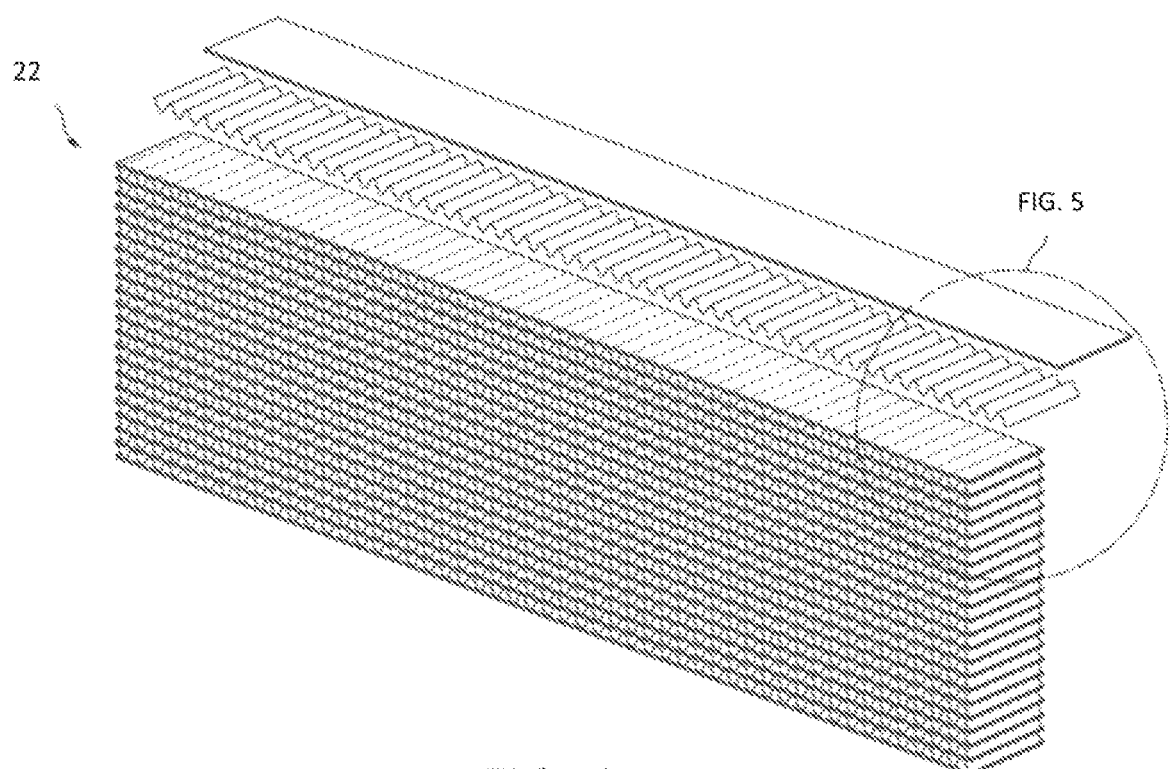
FIG. 4 is a perspective view of a corrugated block useful in constituting the cat scratcher, according to an embodiment of the disclosure.
Figure 5:
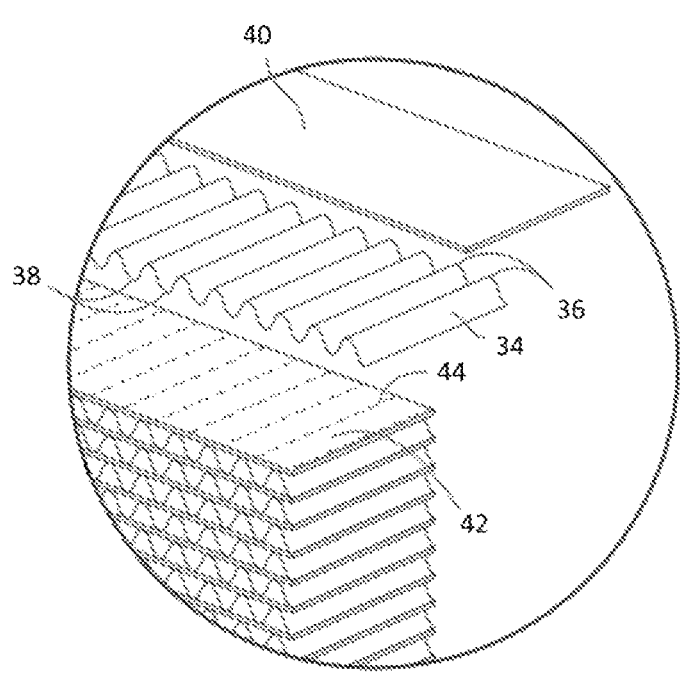
FIG. 5 is a perspective view of the detail of the cardboard block of FIG. 4, according to an embodiment of the disclosure.

It is noted that corrugated cardboard block 22 can be fabricated pursuant to the teachings of commonly-owned U.S. Pat. No. 10,111,406, the disclosure of which is incorporated by reference. Specifically, FIGS. 4 and 5 depict the present invention as it applies to block 22 of corrugated cardboard. As is typically the case, corrugated cardboard comprises a plurality of corrugated subparts, specifically, corrugated sheet 34 having peaks 36 and corresponding valleys 38 and planar sheets of kraft paper 40 and 42 separating each corrugated sheet. Beads of adhesive 44 are applied to the kraft paper such that when corrugated sheet 34 is positioned between opposing sheets of kraft paper 40 and 42, cardboard block 22 is fabricated as a singular, monolithic unit. Generally, starch or dextrin-based adhesives are employed as they are non-toxic and thus pose no health risk to an engaging cat.

In the fabrication of prior cardboard-based scratchers, a common adhesive is employed to glue corrugated and planar sheets together and, if desired, ground catnip or silvervine leaves are sprinkled onto the flutes of the finished cardboard block. As the catnip or silvervine is readily available to the pet, it is quickly dissipated and provides the scratcher with no long-term stimulating effects. As a solution to this deficiency inherent in prior scratchers, the present invention employs a catnip or silvervine hydrosol in a suitable aqueous-based adhesive to create beads 44. It has been found that, in doing so, the integrity of the adhesive is not compromised and yet the desired stimulating effects are available for virtually the entire life of the scratcher.

Furthermore, catnip or silvervine hydrosol, alone, or with chopped catnip leaves can be sprayed onto the surface of block 22 employing, for example, a spray gun to provide catnip or silvervine within the flutes created by corrugated sheets 34. This further enhances the stimulating effects of the scratcher noting that the catnip or silvervine hydrosol penetrates deeply within the flutes and, being a liquid, is absorbed by kraft paper sheets 40 and 42 as well as corrugated sheet 34. Solids, in the nature of chopped catnip or silvervine leaves and/or catnip or silvervine biomass can be included with the catnip or silvervine hydrosol to vary the viscosity of the spray to prevent the spray from passing through block 22 without residing within the flutes as desired employing a proprietary blend of catnip hyrdosol and catnip biomass.

The above disclosure is sufficient to enable one of ordinary skill in the art to practice the invention, and provides the best mode of practicing the invention presently contemplated by the inventor. Notably, as will be appreciated, the techniques of this disclosure provide benefits including efficiency in shipping and increased ability for the cat to relax or lounge in a variety of position, as well as the ability to scratch from different positions, such as standing up or laying on their side(s), along with other advantages. While there is provided herein a full and complete disclosure of the preferred embodiments of the invention, it is not desired to limit the invention to the exact construction, dimensions, relationships, or operations as described. Various modifications, alternative constructions, changes and equivalents will readily occur to those skilled in the art and may be employed as suitable without departing from the true spirit and scope of the invention. Such changes might involve alternative materials, components, structural arrangements, sizes, shapes, forms, functions, operational features or the like. Therefore, the above description and illustration should not be considered as limiting the scope of the invention, which is defined by the appended claims.

The invention claimed is:

1. A cat scratcher comprising:
   a frame comprising a plurality of sidewalls that define a front opening and a rear opening;
   a block of corrugated cardboard having a front surface and a rear surface, the block of corrugated cardboard disposed within the frame such that a portion of the front surface is aligned with the front opening of the frame and a portion of the rear surface is aligned with the rear opening of the frame; and
   a panel that is removably attached to the frame such that the panel covers the rear opening when attached to the frame and is entirely disconnected from the frame when removed from the frame;
   wherein the panel prevents the portion of the rear surface of the block of corrugated cardboard from being exposed through the rear opening of the frame when the panel is attached to the frame;
   wherein removal of the panel exposes the portion of the rear surface of the block of corrugated cardboard through the rear opening of the frame; and
   wherein the rear surface of the block of corrugated cardboard is larger than the rear opening of the frame.

2. The cat scratcher of claim 1, further comprising a hanger that is configured to hang the cat scratcher from a door handle.

3. The cat scratcher of claim 1, wherein the panel is removably attached to the frame by a perforated connection.

4. The cat scratcher of claim 1, wherein an attractant selected from the group consisting of catnip, silvervine, or mixtures thereof is applied to the block of corrugated cardboard.

5. The cat scratcher of claim 1, wherein the block of corrugated cardboard is comprised of at least one open-fluted corrugated sheet of cardboard having a top surface and a bottom surface, and at least one planar sheet of kraft paper adhered to the at least one top surface of the corrugated sheet of cardboard and at least one planar sheet of kraft paper adhered to the at least one bottom surface of the corrugated sheet of cardboard.

6. The cat scratcher of claim 5, wherein each open-fluted corrugated sheet of cardboard is adhered to each planar sheet of kraft paper with an aqueous adhesive.

7. The cat scratcher of claim 6, wherein the aqueous adhesive comprises at least one hydrosol attractant selected from the group consisting of catnip hydrosol, silvervine hydrosol, or mixtures thereof.

8. The cat scratcher of claim 7, wherein at least one of a chopped catnip material and a chopped silvervine material is applied to the block of corrugated cardboard.

9. A cat scratcher comprising:
   a frame comprising a plurality of sidewalls;
   a block of corrugated cardboard disposed within the frame; and
   a panel removably attached to the frame;
   wherein the frame includes a first opening and a second opening;
   wherein the block of corrugated cardboard comprises a first surface and a second surface;
   wherein a portion of the first surface of the block of corrugated cardboard is aligned with the first opening of the frame and a portion of the second surface of the block of corrugated cardboard is aligned with the second opening of the frame;

wherein the panel covers the second opening when attached to the frame and is entirely disconnected from the frame when removed from the frame;

wherein the panel prevents the portion of the second surface of the block of corrugated cardboard from being exposed through the second opening of the frame when the panel is attached to the frame;

wherein the portion of the second surface of the block of corrugated cardboard is exposed through the second opening of the frame when the panel is removed from the frame; and wherein the second surface of the block of corrugated cardboard is larger than the second opening of the frame.

10. The cat scratcher of claim 9, further comprising a hanger that is configured to hang the cat scratcher from a door handle.

11. The cat scratcher of claim 10, wherein the panel is removably attached to the frame by a perforated connection.

12. The cat scratcher of claim 11, wherein the block of corrugated cardboard is comprised of at least one open-fluted corrugated sheet of cardboard having a top surface and a bottom surface, and at least one planar sheet of kraft paper adhered to the at least one top surface of the corrugated sheet of cardboard and at least one planar sheet of kraft paper adhered to the at least one bottom surface of the corrugated sheet of cardboard.

13. The cat scratcher of claim 12, wherein each open-fluted corrugated sheet of cardboard is adhered to each planar sheet of kraft paper with an aqueous adhesive.

14. The cat scratcher of claim 13, wherein the aqueous adhesive comprises at least one hydrosol attractant selected from the group consisting of catnip hydrosol, silvervine hydrosol, or mixtures thereof.

15. The cat scratcher of claim 14, wherein at least one of a chopped catnip material and a chopped silvervine material is applied to the block of corrugated cardboard.

16. A method for increasing the longevity of a cat scratcher, the method comprising:

providing a cat scratcher, the cat scratcher comprising:

a frame comprising a plurality of sidewalls that define a first opening and a second opening;

a block of corrugated cardboard having a first surface and a second surface, the block of corrugated cardboard disposed within the frame such that a portion of the first surface is aligned with the first opening of the frame and a portion of the second surface is aligned with the second opening of the frame; and a panel that is removably attached to the frame such that the panel covers the second opening when attached to the frame and is entirely disconnected from the frame when removed from the frame, wherein removal of the panel exposes the portion of the second surface of the block of corrugated cardboard through the second opening of the frame; and wherein second surface of the block of corrugated cardboard is larger than the second opening of the frame; and removing the panel to expose the portion of the second surface of the block of corrugated cardboard through the second opening of the frame.

17. The method of claim 16, wherein the cat scratcher further comprises a hanger that is configured to hang the cat scratcher from a door handle.

18. The method of claim 17, wherein the panel is removably attached to the frame by a perforated connection.

19. The method of claim 18, wherein the block of corrugated cardboard is comprised of at least one open-fluted corrugated sheet of cardboard having a top surface and a bottom surface, and at least one planar sheet of kraft paper adhered to the at least one top surface of the corrugated sheet of cardboard and at least one planar sheet of kraft paper adhered to the at least one bottom surface of the corrugated sheet of cardboard, and wherein a chopped attractant selected from the group consisting of catnip, silvervine, or mixtures thereof is applied to the box of corrugated cardboard.

20. The method of claim 19, wherein each open-fluted corrugated sheet of cardboard is adhered to each planar sheet of kraft paper with an aqueous adhesive wherein the aqueous adhesive comprises at least one hydrosol attractant selected from the group consisting of catnip hydrosol, silvervine hydrosol, or mixtures thereof.

* * * * *